Feb. 18, 1930. S. C. CLARK 1,747,466
STUCCO MIXER
Filed June 8, 1927 3 Sheets-Sheet 2
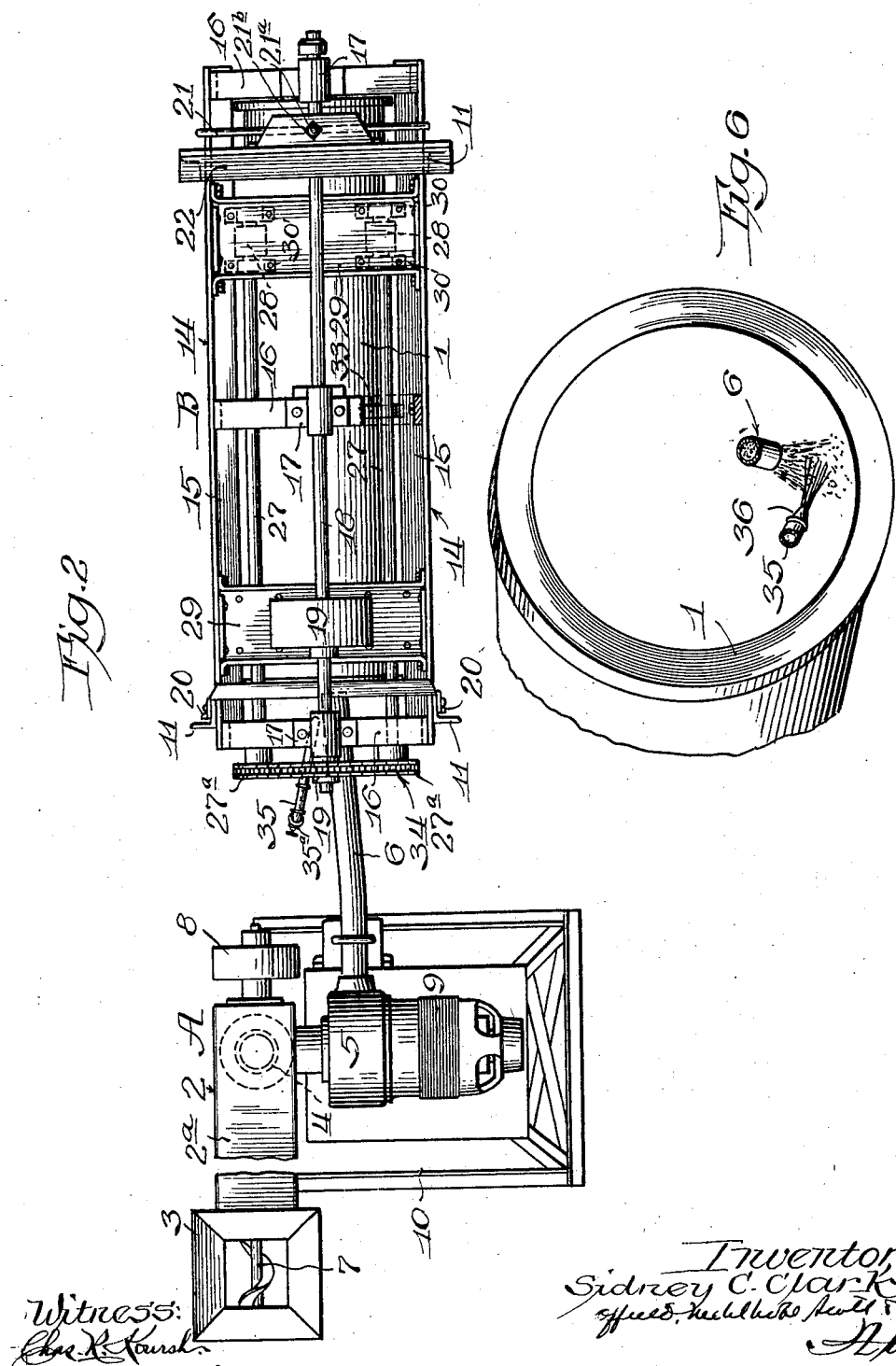

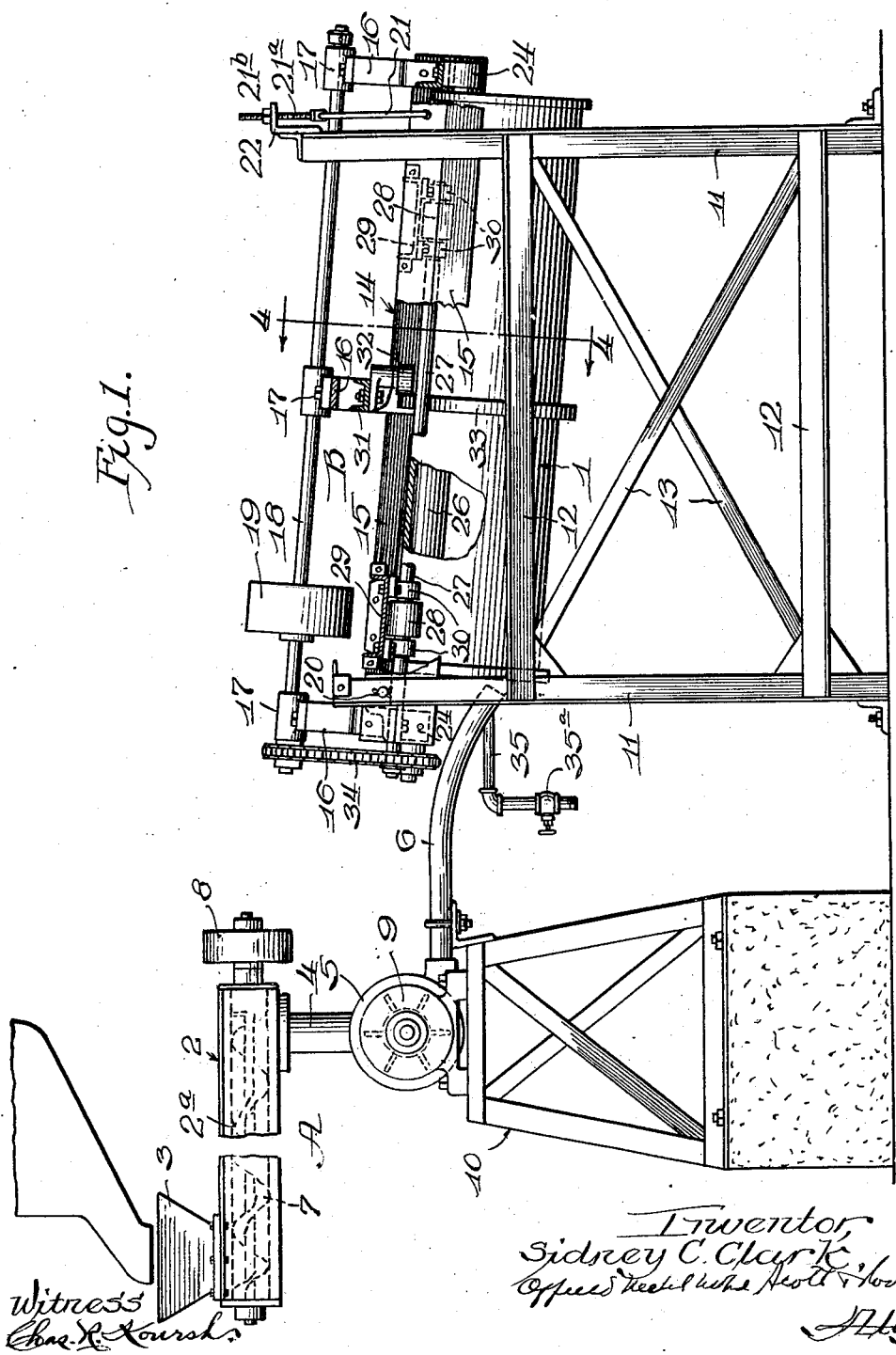

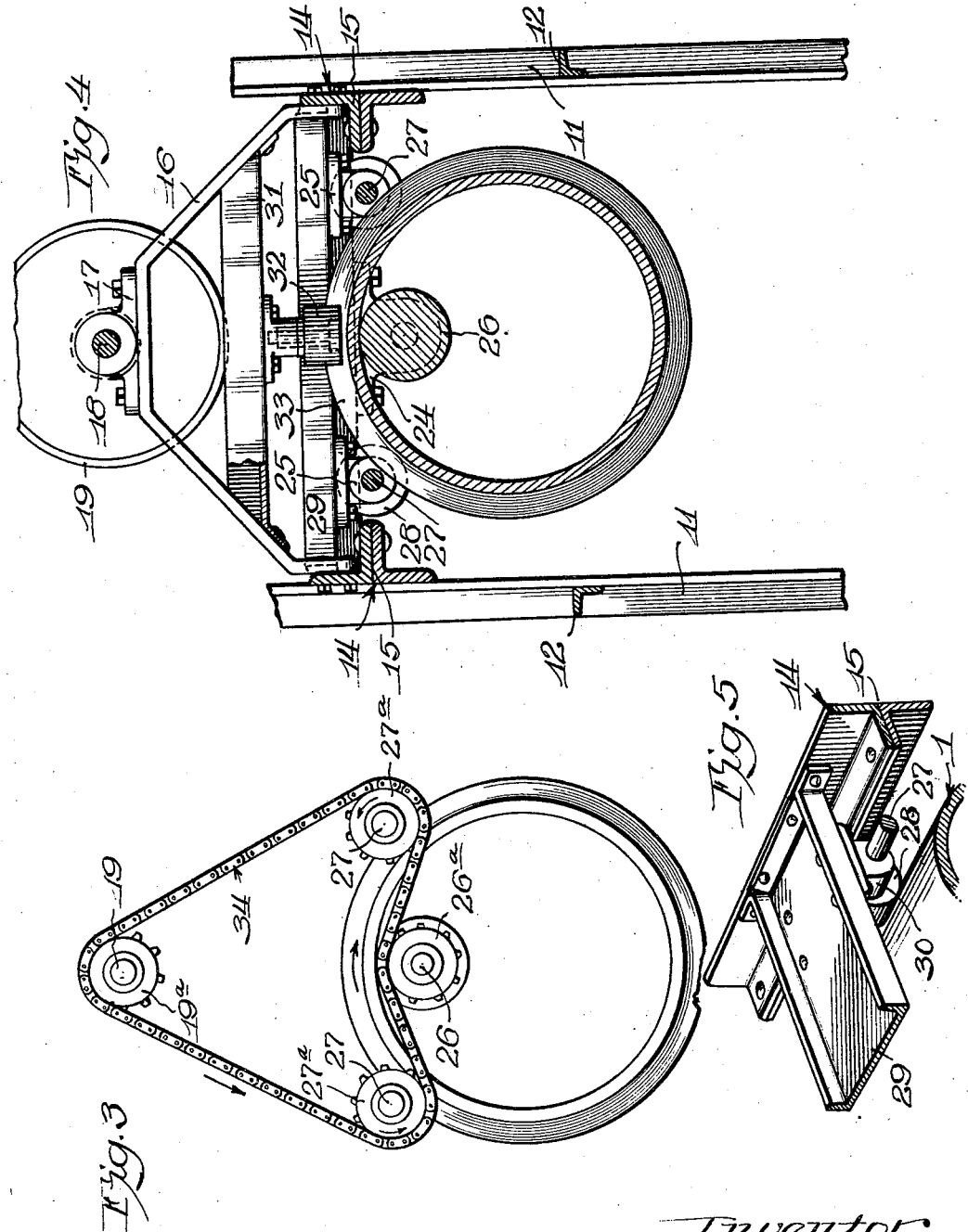

Patented Feb. 18, 1930

1,747,466

UNITED STATES PATENT OFFICE

SIDNEY C. CLARK, OF PORT CLINTON, OHIO, ASSIGNOR TO AMERICAN GYPSUM COMPANY, OF PORT CLINTON, OHIO, A CORPORATION OF OHIO

STUCCO MIXER

Application filed June 8, 1927. Serial No. 197,256.

This invention relates to improvements in stucco mixers, and more particularly to an apparatus for mixing stucco or calcined gypsum in a dry powdered state with water or other ingredients required to form the wet plastic mix from which various gypsum products are made.

The object of the invention is to provide an improved method for the continuous mixing of stucco and water and operating on a different principle than has been followed heretofore, and one calculated to give better and more uniform results.

A further object of the invention is to provide a mixing apparatus designed to replace the ordinary so-called "soaking belt" heretofore generally used and forming a part of machines employed in the manufacture of gypsum products.

As well known in the gypsum industry, stucco is the term applied to calcined gypsum, that is, the product obtained by calcining or partly calcining the gypsum rock,—a process consisting of heating the crushed rock in rotary kilns to drive off a certain percentage (roughly 80%) of the water of crystallization. In its calcined state, the gypsum or stucco is a powdered substance and when subjected or mixed with water immediately absorbs an amount equivalent to that removed by calcination, and crystallization or setting immediately commences. In other words, the tendency of the stucco in the presence of water is to take up its normal water of crystallization content and to resume the crystalline formation possessed in its natural state as gypsum rock, although of a finer and more uniform texture.

The proper treatment of stucco in order to promote the formation of the crystalline structure upon which the strength and durability of the finished product as a building or insulating material is dependent, requires first, that each particle of stucco be given ample opportunity of absorbing its full volume of water, and secondly, that as soon as the absorption has been completed that the mass of stucco be allowed to set as soon as possible without unnecessary agitation or disturbance. In other words, that the wet stucco be reduced to its final form without undue agitation or mixing. The reasons for this are two-fold: In the first place, if the particles of stucco do not absorb the required amount of water, the crystallization process will be retarded and incomplete, and secondly, since the formation of crystals commences immediately in the presence of water, any agitation or mixing thereafter necessarily tends to break down the crystals and otherwise interfere with their normal formation, with the result that the structure will be weakened due to the interference with the crystal propagation.

The ordinary method of treating stucco is therefore open to criticism for the reasons above pointed out. The usual method of mixing stucco with water is to deliver the dry stucco onto what is known as a "soaking belt", the material being spread to a uniform thickness on the belt and then furrowed so that it is thicker at some portions of the layer than others. The belt travels continuously in a general horizontal direction, dipping into and out of a shallow tank of water located near the receiving end of the belt, and thence resuming a straight line travel, passes beneath sets of mechanical mixers which stir the soaked stucco on the belt just before it is discharged for immediate use in the making of the particular product.

The formation of furrows is intended to increase the penetration of the dry stucco with the water, but as a practical matter, there are portions of the stucco near the bottom of the layer and particularly where the depth is greatest, which are not penetrated by the water during the relatively short period of immersion, and as a consequence, there is not the requisite water absorption for complete crystallization throughout the entire mass. Moreover, since the setting of the stucco commences immediately upon immersion, it follows that the mixing to which the stucco is subjected during the initial stage of crystal formation, necessarily results in the breaking down of the crystals and otherwise interfering with the process of crystallization which should be permitted to take place without undue disturbance. In short, this so-called soaking and mixing process in the course of converting raw gypsum into a commercial product, is manifestly wrong in principle, since it tends to obstruct the operation of those natural laws which give the stucco its valuable properties as a building material.

The method of mixing as accomplished by the apparatus herein disclosed, is one calculated to introduce what is believed to be the correct method of bringing the dry stucco and the water into intimate contact, with the idea of affording maximum water saturation with the minimum degree of mechanical agitation or mixing. In a word, the process involves the principle of intermingling streams or spray jets of stucco and water into a semi-enclosed rotary chamber, whereby the mixing is primarily accomplished in the air, so to speak, and the wet mass collected and kneaded or rolled into a uniform texture by treatment in the rotary chamber of such a nature as to preserve rather than break down the crystal formations.

A preferred construction for an apparatus embodying the novel principles of stucco mixing, is illustrated in the accompanying drawings, in which Figure 1 is a general view in side elevation of the mixing apparatus.

Figure 2 is a plan view of the mixing apparatus.

Figure 3 is a view in elevation of the mixing cylinder at the inlet end thereof.

Figure 4 is a view in end elevation of the rotative cylinder mixer.

Figure 5 is a perspective view of a detail of the cylinder drive rollers; and

Figure 6 is a view in perspective of the inlet end of the cylinder mixer showing the relative position of the stucco and water delivery pipes.

Referring to the general arrangement of the mixing apparatus, the same comprises a feeding and discharging mechanism A for the dry stucco and the rotary cylinder mixing or kneading mechanism B. The function of the stucco feeding mechanism is to discharge the stucco in the form of a blast into the mouth or inlet end of the rotary cylinder 1 of the mixing mechanism B, the same being supported on trunnions with its axis inclined at a small angle of slope to the horizontal to bring its discharge end at a lower level than its inlet and thus accelerate the movement of the mass through the cylinder by gravity.

The stucco feeding mechanism consists generally of a horizontal conveyor 2 having a feed hopper 3 at its forward end, and a short down passage 4 at its discharge end leading to a motor driven impeller fan 5 which in turn discharges through a horizontal pipe 6 toward the open inlet end of the rotary cylinder 1 and terminating in a downward bend 6ª directed toward the bottom of the cylinder just inwardly from the mouth of the cylinder. The conveyor 2 is preferably of the screw type consisting of a horizontal duct 2ª or closed trough in which a screw shaft or propelling screw 7 is mounted, the same being suitably journaled and belt-driven at the required speed from a pulley 8 mounted at the forward end of the shaft projecting beyond the end of the duct. The hopper 3 is positioned above the forward end of the duct and discharges at its lower end directly into the same. The dry stucco is fed to the hopper in any suitable manner, as for instance, through a chute from above or kept filled to a predetermined level by a conveyor belt leading from a suitable source of supply.

The impeller fan 5 is mounted just below the discharge end of the conveyor 2 and may be of any suitable or standard design, although one consisting of radial blades mounted on a shaft enclosed within a cylindric housing has been found satisfactory for the purpose. An electric motor 9 mounted adjacent the fan 5 and directly connected to the shaft thereof provides the motive power for the fan. As indicated in Figure 1, the feeding apparatus as well as the mixing apparatus is elevated some distance above the floor of the plant in which they are erected, and hence a suitable supporting frame 10 is erected to support them. Thus the feeding apparatus has supporting frames at each end of the conveyor 2 which need not be described in detail, but which, as can be readily observed, support the hopper and intake end of the conveyor and the fan, motor and discharge end of the conveyor, the latter being supported through the pipe 4.

The mixing apparatus B is mounted on a frame comprising four corner uprights 11, cross members 12 and diagonal braces 13, the cylinder with its immediate supporting and driving members being carried by a separable movable frame or cradle 14 suspended or cradled between the pairs of uprights 11—11 of the stationary frame.

The cylinder 1 is journaled in the movable frame 14 to rotate about its axis, the frame 14 in turn being journaled at its head end to the stationary frame for a limited vertical adjustment of the tail or discharge end of the cylinder to vary the tilt or inclination of its axis to the horizontal.

Referring now to the construction of the cylinder cradle 14, the same preferably consists of two longitudinal side frame members 15 somewhat longer than the cylinder, these side frame members being shown as two angle irons bolted together, although they may be of any convenient form. Extending above and between the side frame members and located at each end and intermediate of said frame, is a bracket 16 made of strap iron bent in pyramid shape with a flat top portion to which is bolted a journal bearing 17. Extending lengthwise of the cradle and journaled in these aligned journal bearings 17 is a drive shaft 18. At some point on the shaft is a belt pulley 19 which drives the shaft from a suitable source of motive power. The head end of the cradle is pivotally supported by pivot pins 20 passing through the upright supports 11 and near their upper ends and the longitudinal frame members. The tail or lower end of the cradle is suspended by a bail 21 connected with the adjacent ends of the frame members 15 and having a central rod 21$^a$ passing through an angle iron 22 extending crosswise between the upper ends of the uprights 11, the rod being threaded and carrying a nut 21$^b$ which is turned to elevate or lower the cradle to the desired angle of inclination.

Referring now to the means for supporting the cylinder 1 in the tiltable frame or cradle, a cross-beam 23—23 extends between the longitudinal frame members 15—15 at each end of the cradle 14. Fixed to the underside of these crossbeams 23 of the cradle are sets of three journal bearings, viz, a central bearing 24 and two outer bearings 25—25 on opposite sides of the central bearing, the latter being somewhat larger and extending a short distance below the side bearings. Extending lengthwise of the cradle and journaled at its ends in the center bearings 24—24 is a roller 26 from which the cylinder 1 is suspended for free rotation, said roller passing through the cylinder and bearing against the upper surface thereof. Similarly there is journaled in each of the side bearings a shaft 27 extending exterior but adjacent the cylinder, there being mounted on each shaft a pair of rolls or enlarged cylindric portions 28 located inwardly from the ends of the cylinder and bearing against the exterior thereof at points removed at angles of about 30° on opposite sides of the main or central supporting roller 26. Additional cross members 29—29 extending between the frame members 15—15 and above the rolls 28 are preferably provided for supporting pairs of shaft bearings 30—30 on either side of the shafts 27—27 as shown in Figures 1 and 5. Still another cross beam 31 is supported between the end portions of the central bearing supporting bracket which in turn carries thrust roller 32 engaging in a ring 33 surrounding the central portion of the cylinder and acts to hold the same against endwise movement toward its lowermost end (Figure 4).

Mounted in the forward ends of each of the shafts 26, 27, 27 and the drive shaft 19 adjacent the forward or higher end of the cylinder, are sprocket wheels 26$^a$, 27$^a$, 27$^a$ and 19$^a$ respectively. Engaging these sprocket wheels is a drive chain 34 whereby the shafts 25, 26, 26 are driven from the main drive shaft 19 in the same direction and at the same speed to drive the cylinder 1 as shown by the arrows in Figure 3.

The foregoing completes the construction of the mixing machine which consists, as already shown, of a fan or blower for introducing the stucco under air pressure through a pipe opening into the inlet end of an open-ended cylinder or barrel mounted to turn about its axis which is tilted downwardly toward its discharge end.

The discharge end of the stucco delivery pipe 6 is shown as directed toward the bottom of the cylinder just inwardly from its inlet end, although it may be directed upwardly or laterally at different angles if found to be more satisfactory, or spaced at a greater distance from the wall of the cylinder. Coacting with the discharge pipe for the stucco is a water pipe 35 leading from a suitable source of water supply and terminating near the end of the stucco pipe 6 in a nozzle 36 designed to discharge the desired volume of water in the form of a diverging stream into the path of the stucco issuing from its pipe 6, the volume of water discharged being controlled by a valve 35$^a$ in the pipe 35. Considerable latitude may be permitted in the exact arrangement of the water and stucco discharge, the essential feature being the intermingling of the two finely divided streams in such a manner that the stucco is subjected to a thorough and complete mixing with the water. In general, however, the two streams would converge toward some point removed from but in the direction of the inner surface of the cylinder, in some such manner as shown in Figure 6, so that the two streams meet before the surface of the cylinder is reached. In this way, the stucco absorbs or takes up its required volume of water and then is delivered against the revolving inner surface of the cylinder in a completely saturated and wet state. The cylinder is revolved at a moderate rate of speed, just sufficient to keep the wet mass progressing uniformly toward the discharge end, at the same time being rolled or kneaded into the proper consistency by the action of the cylinder and the roller 26. As the wet stucco adheres to the surface of the cylinder, it is carried upwardly until it encounters the roller 26 which acts to scrape the stucco from the cylinder whereupon it drops to the bottom and again carried around and dropped until it works its way to the lower end of the cylinder and is finally discharged onto a conveyor belt or other receptacle.

In the normal operation of the machine, the rotation of the central supporting roller 26 is sufficient to revolve the cylinder with it at a uniform speed, with a possible slippage due to the stucco working in between the roller and the surface of the cylinder. This, however, is reduced to a minimum by the pairs of exterior drive rolls 28—28 which come into play whenever there is a lifting of the cylinder from the central roller, since obviously these rolls resist any upward movement and immediately take the driving load. At other times, they may only idle against the outer surface of the cylinder in readiness to drive when necessary, but at all times serving to hold the cylinder in position and against lateral displacement. If desired, other materials may be introduced into the stucco at the same time that its mixture with the water takes place, or at any time during the passage of the wet stucco through the cylinder. This is a matter of providing the necessary feeding and discharging pipes or ducts, and positioning them to discharge at the desired angle and point in the cylinder.

By utilizing a machine such as herein described, it is possible to introduce the improved method of mixing referred to at the outset of this disclosure, namely, that of bringing the stucco and water together into intimate contact so that each particle of stucco can absorb its requisite volume of water, which is best brought about by breaking up both the stucco and water into spray-like converging streams introduced under pressure into a revolving cylinder, the latter serving to mix the wet mass sufficiently to give it a uniform consistency but not of a violent character so as to retard the natural setting of the stucco. Moreover, the mixing of the stucco and water being practically completed upon the meeting of the streams, the period required for the mixing in the cylinder is relatively short so that all agitation has been completed before the setting process has scarcely commenced and hence the period of treatment is reduced to a minimum.

Mechanically, the machine has its advantages being comparatively simple in construction, operation and maintenance. It occupies but a fraction of the space required for the common form of soaking belt and mechanical mixers, and there is no belt to replace and adjust.

Obviously numerous adaptations of the same structure may be designed to accomplish the same purpose and therefore I do not intend to limit my invention to any specific disclosure herein made.

I claim as my invention:

1. In a machine for the purpose described, the combination of a mixer, means for pneumatically impelling a dry material in finely divided form into said mixer, and a fluid discharge pipe directed toward said mixer and arranged to traverse the path of said dry material as it enters said mixer.

2. In a machine for the purpose described, the combination of a mixer having an inlet opening, a liquid supply pipe having a discharge nozzle directed into said inlet opening, and means for pneumatically impelling a dry material in finely divided form under pressure toward said inlet opening and traversing the discharge from said liquid discharge pipe.

3. A mixing machine comprising a rotative cylinder open at each end, a pipe having its discharge end directed into one end of said cylinder, pneumatic means for continuously feeding a dry material in finely divided form and under pressure through said pipe, and a liquid supply nozzle also directed into said cylinder and intersecting the path of the material and air delivered from said pipe.

4. A mixing apparatus comprising an axially rotative open-ended cylinder mounted in substantially horizontal position, a blower having its discharge directed into one end of said cylinder, means for feeding a dry material in finely divided form to said blower, and means for supplying water under pressure in the form of a spray jet intersecting the path of the material discharged from said blower adjacent said end of the cylinder.

5. The method of mixing consisting of directing a stream of dry material in finely divided form by an air blast into a mix receiver, directing a spray of liquid toward said receiver and intersecting said stream of dry material and air before it enters said receiver, and thereafter kneading and treating the wet mix in the receiver.

6. In a machine for the purpose described, the combination of a mixer having an inlet opening, and means for pneumatically directing a stream of dry substances in finely divided form and directing fluid substances in finely divided form toward the inlet opening of said mixer under pressure, said streams intersecting prior to their introduction into said mixer.

7. In a machine for the purpose described, the combination of a rotative mixer having an inlet opening, pneumatic means for introducing a stream of dry material in finely divided form into the opening of said mixer, and a liquid supply nozzle directed toward said opening and intersecting the stream of dry material.

8. The method of forming a plastic mix consisting of impelling a dry pulverized material by air pressure, an air stream through an orifice into a mechanical mixer, directing a spray jet of water into said mixer so as to intersect the stream of dry material and air as it issues from said orifice, and further treating the mixture in said mixer.

9. A method for forming a plastic mix consisting of feeding a dry pulverized material through a duct under air pressure and in an air stream into the receiving end of a rotary mixer, directing a liquid spray into said receiver to intersect the stream of dry material and air whereby the particles come into intimate and violent contact before reaching said mixer, and further treating the mix in said receiver.

Signed at Port Clinton, Ohio, this 3rd day of June, 1927.

SIDNEY C. CLARK.